P. SWEENEY.
Tuyere Water-Pipe.
No. 9,143. Patented July 20, 1852.
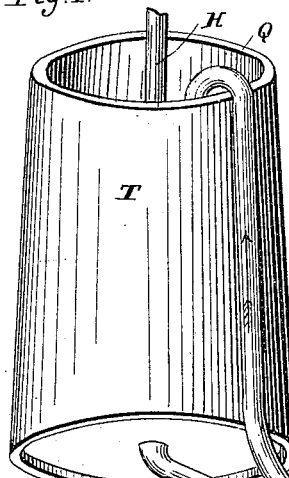
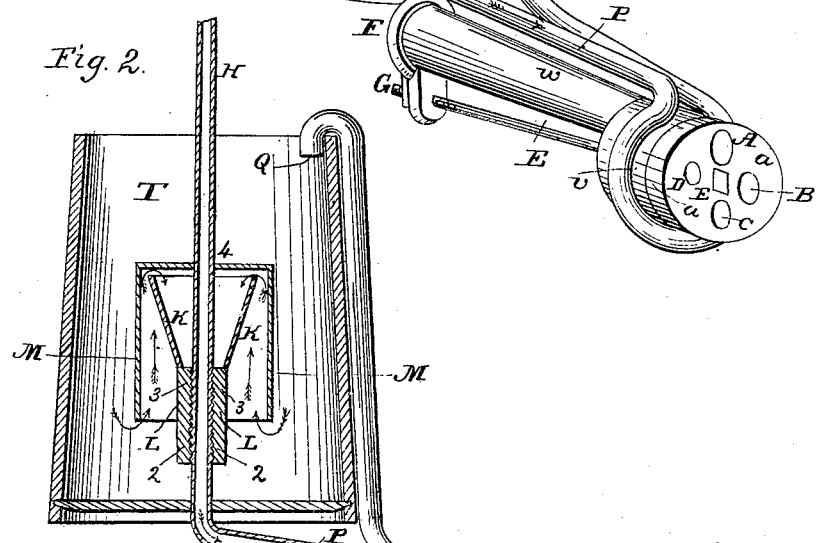
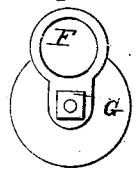
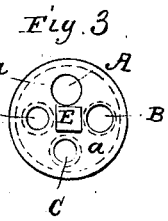

UNITED STATES PATENT OFFICE.

PETER SWEENEY, OF BUFFALO, NEW YORK.

WATER-PIPE OF TWYERS.

Specification of Letters Patent No. 9,143, dated July 20, 1852.

*To all whom it may concern:*

Be it known that I, PETER SWEENEY, of the city of Buffalo, in the county of Erie and State of New York, have invented a new and useful Improvement in Twyer-Pipes, whereby I am enabled to permit water to flow to the twyer for the purpose of keeping it cool or displace it at pleasure; and I do hereby declare that the following is a clear, full, and exact description thereof, reference being had to the drawings hereunto annexed and forming part of this specification.

The nature of my invention consists in combining with the circulation water pipe for cooling the twyer, another pipe by which I am enabled to shut off the circulation of water, and blow the water out of the circulating pipe. The object of my invention being to avoid the evils which arise from the freezing of the water in the circulating pipe of the twyer in cold weather.

In the drawings, Figure 1 is a perspective view, Fig. 2 is a sectional view, Fig. 3 is a front view, and Fig. 4 is a view of the back end.

In Figs. 1 and 2, T represents the vessel that contains the water, and which stands in the rear of the forge. In the same figures F, A, W, represents the twyer; P V Q is the pipe through which the water circulates around the twyer, one end of which passes over the top of the vessel T, and the other end of which enters the bottom of the same vessel, by means of which the twyer is kept perfectly cool.

H represents the pipe fitted to the pipe P V Q at L L, as is seen in Fig. 2, and may be readily separated from P V Q, and thus permit the water to circulate through it or it may form a water-tight joint, and by being blown into the water may be forced out of the pipe P V Q, and the water thus prevented from circulating through the pipe P V Q to the twyer. The funnel S K and the cylinder M, M, in Fig. 2 is for the purpose of preventing the dirt from entering the pipe P V Q. But it is evident that there are many other modes more simple for keeping the dirt out of the said pipe which prevents me from using the funnel K, and the cylinder M M in all cases.

X A, in Fig. 2 is the passage through which the air comes from the bellows to the fire. On the end of the twyer which lies in the fire is a cover, a, with several holes therein for the purpose of regulating the blast, it is fastened to the twyer at S S with the bolt E which passes from the front to the back of the twyer, and which is tightened by the nut G as is shown in the Figs. 1 and 2, of the drawings hereunto annexed. The said cover may be convenient for the purpose described, in many cases, but in all cases, I do not confine myself to its use.

What I claim and desire to secure by Letters Patent, is—

The combination of the pipe H, with the circulating pipe P, V, Q, so connected that H may be removed from, or form a water tight joint with P, V, Q, whereby I am enabled to blow all the water out of the latter and at the same time to shut off its communication with the cistern, in the manner, and for the purposes described.

PETER SWEENEY.

Witnesses:
EDW. F. FOLGER,
HORACE PRENTICE.